(12) United States Patent
Weinstein et al.

(10) Patent No.: US 8,289,687 B2
(45) Date of Patent: Oct. 16, 2012

(54) MULTI-PANEL SLIDING COVER FOR A DEVICE

(76) Inventors: Marc Chase Weinstein, Roslyn Harbor, NY (US); Alfredo Cinco, San Juan (PH)

( * ) Notice: Subject to any disclaimer, the term of this patent is extended or adjusted under 35 U.S.C. 154(b) by 1202 days.

(21) Appl. No.: 11/608,844

(22) Filed: Dec. 11, 2006

(65) Prior Publication Data
US 2007/0136405 A1    Jun. 14, 2007

Related U.S. Application Data

(60) Provisional application No. 60/748,952, filed on Dec. 9, 2005.

(51) Int. Cl.
G06F 1/16 (2006.01)
H05K 5/00 (2006.01)
H05K 7/00 (2006.01)
(52) U.S. Cl. .................... 361/679.3; 455/575.4
(58) Field of Classification Search ........... 361/679.21, 361/679.23, 679.26, 679.3, 679.55; 455/575.1–575.4, 575.8
See application file for complete search history.

(56) References Cited

U.S. PATENT DOCUMENTS

| | | | |
|---|---|---|---|
| 3,622,720 A | | 11/1971 | Allen |
| 3,659,745 A | | 5/1972 | Striegl et al. |
| 4,398,086 A | * | 8/1983 | Smith, III ............. 463/46 |
| 4,425,499 A | | 1/1984 | Newton |
| 4,731,945 A | * | 3/1988 | Howard ............... 40/491 |
| 4,745,397 A | * | 5/1988 | Lagerbauer et al. ....... 341/23 |
| 5,128,662 A | * | 7/1992 | Failla ................. 345/1.3 |
| 5,224,076 A | * | 6/1993 | Thorp ................. 368/10 |
| 5,530,234 A | | 6/1996 | Loh et al. |
| D372,932 S | * | 8/1996 | Tamura et al. ........... D14/345 |
| 5,664,228 A | * | 9/1997 | Mital ................. 710/62 |
| 5,796,575 A | | 8/1998 | Podwalny et al. |
| 5,828,410 A | * | 10/1998 | Drapeau ............. 348/383 |
| 5,907,615 A | * | 5/1999 | Kaschke ............. 379/433.12 |
| 5,923,307 A | * | 7/1999 | Hogle, IV ............ 345/4 |
| 6,035,035 A | * | 3/2000 | Firooz ................ 379/433.1 |
| 6,151,401 A | * | 11/2000 | Annaratone ........... 381/388 |
| 6,205,021 B1 | * | 3/2001 | Klein et al. ........... 361/679.17 |
| 6,222,507 B1 | * | 4/2001 | Gouko ............... 345/1.1 |
| 6,233,469 B1 | * | 5/2001 | Watanabe ........... 455/575.1 |
| 6,295,038 B1 | * | 9/2001 | Rebeske ............ 345/1.1 |
| 6,297,945 B1 | * | 10/2001 | Yamamoto .......... 361/679.04 |
| 6,302,612 B1 | * | 10/2001 | Fowler et al. .......... 403/76 |
| 6,308,084 B1 | * | 10/2001 | Lonka .............. 455/556.1 |
| 6,327,482 B1 | * | 12/2001 | Miyashita .......... 455/566 |
| 6,370,362 B1 | | 4/2002 | Hansen et al. |
| 6,392,871 B1 | * | 5/2002 | Yanase ............. 361/679.07 |
| 6,504,706 B2 | * | 1/2003 | Stewart ............ 361/679.04 |
| 6,532,146 B1 | * | 3/2003 | Duquette ........... 361/679.04 |

(Continued)

FOREIGN PATENT DOCUMENTS

WO    WO 2006102541    9/2006

(Continued)

*Primary Examiner* — Adrian S Wilson
(74) *Attorney, Agent, or Firm* — Lawrence C. Edelman, Esq

(57) ABSTRACT

The present invention relates to a method and apparatus for providing a multi-panel cover component for a multi-panel body component nested within the cover component. The cover component is moveable with respect to the body component, so as to provide an image or functional change in the component being presented to a user of the apparatus, when the user moves the cover component, so as to cover or uncover the body component.

29 Claims, 15 Drawing Sheets

U.S. PATENT DOCUMENTS

| | | | | |
|---|---|---|---|---|
| 6,643,124 | B1 * | 11/2003 | Wilk | 361/679.04 |
| 6,707,664 | B2 * | 3/2004 | Murphy | 361/679.16 |
| 6,744,624 | B2 | 6/2004 | Siddiqui | |
| 6,748,249 | B1 * | 6/2004 | Eromaki et al. | 455/575.4 |
| 6,819,304 | B2 * | 11/2004 | Branson | 345/1.3 |
| 6,844,865 | B2 * | 1/2005 | Stasko | 345/1.3 |
| 6,850,226 | B2 * | 2/2005 | Finke-Anlauff | 345/169 |
| 6,859,219 | B1 * | 2/2005 | Sall | 345/1.1 |
| 6,931,265 | B2 * | 8/2005 | Reyes et al. | 455/566 |
| 6,983,919 | B2 * | 1/2006 | Kroggel | 248/442.2 |
| 7,050,767 | B2 * | 5/2006 | Hickey et al. | 455/90.3 |
| 7,076,058 | B2 * | 7/2006 | Ikeuchi et al. | 379/433.12 |
| 7,092,247 | B2 * | 8/2006 | Kim | 361/679.04 |
| 7,099,708 | B2 * | 8/2006 | Ronkko | 455/575.1 |
| 7,107,018 | B2 * | 9/2006 | Jellicoe | 455/90.3 |
| 7,136,282 | B1 * | 11/2006 | Rebeske | 361/679.55 |
| 7,196,676 | B2 * | 3/2007 | Nakamura et al. | 345/1.1 |
| 7,221,330 | B2 * | 5/2007 | Finke-Anlauff | 345/1.1 |
| D548,213 | S * | 8/2007 | Lee et al. | D14/138 AC |
| D551,644 | S * | 9/2007 | Kim et al. | D14/138 AB |
| 7,271,997 | B2 * | 9/2007 | Kee et al. | 361/679.27 |
| D552,573 | S * | 10/2007 | Sheu | D14/138 AD |
| 7,292,882 | B2 * | 11/2007 | Lee et al. | 455/575.4 |
| RE40,204 | E * | 4/2008 | Yamamoto | 361/679.27 |
| 7,414,830 | B2 * | 8/2008 | Weinstein et al. | 361/679.27 |
| 7,469,156 | B2 * | 12/2008 | Kota et al. | 455/575.4 |
| 7,665,888 | B2 * | 2/2010 | Weinstein et al. | 368/276 |
| 7,761,123 | B2 * | 7/2010 | Hyun et al. | 455/575.1 |
| 2003/0073414 | A1 * | 4/2003 | Capps | 455/90 |
| 2003/0157957 | A1 * | 8/2003 | Wendorff et al. | 455/550 |
| 2003/0202656 | A1 * | 10/2003 | Ikeuchi et al. | 379/419 |
| 2003/0218860 | A1 * | 11/2003 | Shiraiwa | 361/681 |
| 2004/0042163 | A1 * | 3/2004 | Tutikawa | 361/683 |
| 2005/0009556 | A1 * | 1/2005 | Hickey et al. | 455/550.1 |
| 2005/0009581 | A1 * | 1/2005 | Im et al. | 455/575.4 |
| 2005/0070348 | A1 * | 3/2005 | Lee et al. | 455/575.4 |
| 2005/0090298 | A1 * | 4/2005 | Park et al. | 455/575.4 |
| 2006/0017700 | A1 | 1/2006 | Kemppinen | |
| 2006/0109677 | A1 | 5/2006 | Hou | |
| 2006/0111052 | A1 | 5/2006 | Gartrell | |
| 2007/0153456 | A1 * | 7/2007 | Lin | 361/681 |
| 2007/0279849 | A1 * | 12/2007 | Weinstein et al. | 361/680 |
| 2007/0285880 | A1 * | 12/2007 | Weinstein et al. | 361/681 |

FOREIGN PATENT DOCUMENTS

WO    WO 2007067996 A2 *   6/2007

* cited by examiner

MULTI-PANEL SLIDING COVER FOR A DEVICE

CROSS-REFERENCE TO RELATED APPLICATIONS

This application claims priority under 35 USC 120 of U.S. Provisional Patent Application No. 60/748,952 filed Dec. 9, 2005, entitled "Hidden Panel Cover For A Device." The entire disclosure of the aforementioned provisional application is incorporated herein by reference in its entirety.

BACKGROUND OF THE INVENTION

Technical Field of the Invention

The present invention relates to a method and apparatus for providing a multi-panel cover component for a multi-panel body component nested within the cover component. The cover component is moveable with respect to the body component of the apparatus, so as to at least partially cover or uncover the body component, and thereby provide an image or functional change in the component being revealed to a user of the apparatus. Accordingly, the apparatus performs multiple functions or has multiple purposes which are facilitated by a change in state, shape or relation of the components of the apparatus. Such apparatus may provide particular advantage when used, for example, in advertising or as promotional articles.

SUMMARY OF THE INVENTION

The present invention provides a multi-state assembly which, through changes in the spatial relationship between relatively movable parts thereof, shifts so as to provide to a user of the assembly, a first state of the assembly or a second state of the assembly. The different states may serve different functions or have different purposes. One example of such an assembly is a construct formed of two multi-panel components which are nested one with the other, so as to be able to slide one with respect to the other between a first and a second relative spatial position. The first and second positions may correspond to providing to the user of the device the first and second different states or functions of the assembly. One multi-panel component is a cover component, and the other multi-panel component is a body component. The multi-panel components of at least one of the cover and body components are tiered so as to provide a plurality of multiple panels on correspondingly different spatial planes. The multiple panels of the cover and body components are sized so that in the first relative position, multiple panels of the cover component overlap multi-panels of the body component and thereby serve as a cover thereover, and in the second relative position, at least one panel of the body component overlaps at least one panel of the cover component. The first and second relative positions of the panels may result in a full or partial overlap of the panels.

In one embodiment of the invention, the cover component may present a relatively passive state or function, and comprise, for example, an image or portion of an image on a plurality of the multiple panels thereof, while the body component may present a relatively active state or function, and include, for example, a portion of a calculator on a plurality of the multiple panels thereof. In an alternative embodiment, the cover can include an active component on its panels, or can have a mix of active and passive components. In a similar manner, the body component can include a passive component on its panels, or can also have a mix of active and passive components.

In accordance with a further aspect of the invention, the panels of the cover component not only serve to conceal and/or protect access to the panels of the body component when the body component is not in use, but also provide an interesting space for positioning an advertising message or other graphic or image to the user/owner of the device. Such cover panels also allow for the possibility of the user to personalize one or more of the cover panels.

More specifically, a particular advantage of forming such a cover by using sliding panels is that the visible outside surface of these panels can include any type of graphic image thereon, such as advertising logos or designs, familiar characters or other design elements. Such images can be created in accordance with many various techniques, including direct printing of images and text or can be affixed with printed stickers, photographs, etc. Furthermore, the images or designs could be formed in the material of the cover panels themselves. Additionally, as noted above, the user of the device may be able to customize it by affixing an image of his own choosing to one or more of the panels, such as to a cover panel having means for allowing the user to attach a photograph or portion of a photograph to the panel.

The use of a sliding panel cover provides a particular advantage in this invention, since the visible surface it provides for the graphic image actively changes during the opening and closing of the cover, thereby creating a visually unique and interesting graphic area which can be used as advertising space directed to users of the device, or for providing a pleasing graphic image, with or without a subtle message.

It is to be understood that although in one embodiment of the invention, the body component of the device is electronic, non-electronic body components could also benefit just as well from the invention.

A method for providing the above-noted features is also described.

BRIEF DESCRIPTIONS OF THE DRAWINGS

The accompanying drawings, which are incorporated herein and constitute part of this specification, illustrate embodiments and details of the invention and, together with the general description given above and the detailed description given below, serve to explain various embodiments and aspects of the invention. These drawings are exemplary and may not be to scale, and like reference numerals represent like elements throughout the several views, These and other advantages of the invention will become apparent upon reading the following detailed description and upon referring to the drawings in which:

FIGS. 1A, 1B, and 1C illustrate a calculator embodiment of the present invention, having a cover shown in the fully closed, partially open and fully open positions, respectively.

FIGS. 11A, 11B, and 11C, 12A, 12B, and 12C, and 13A, 13B, and 13C all illustrate a calculator embodiment of the present invention, having a cover shown in the fully closed, partially open and fully open positions, respectively, where the overall shape of each of the calculator embodiments is different.

Figure 14A:
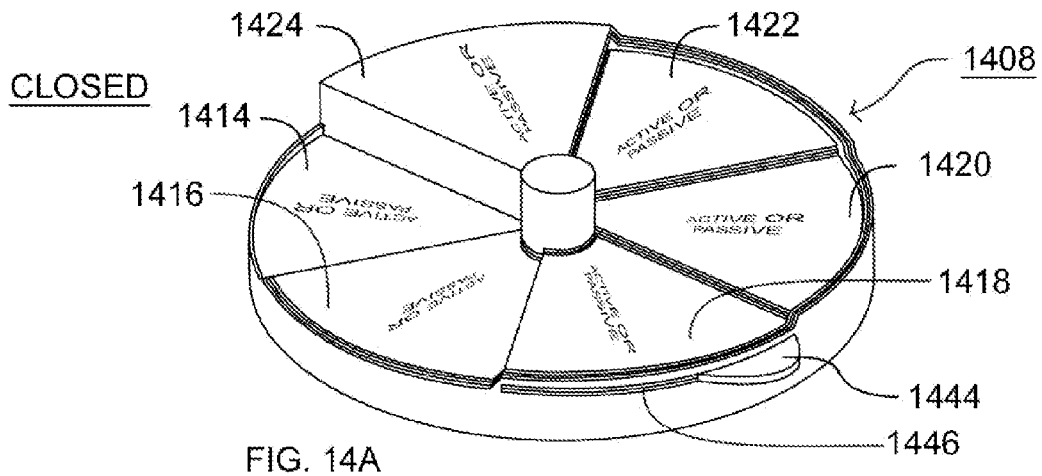
Figure 14B:
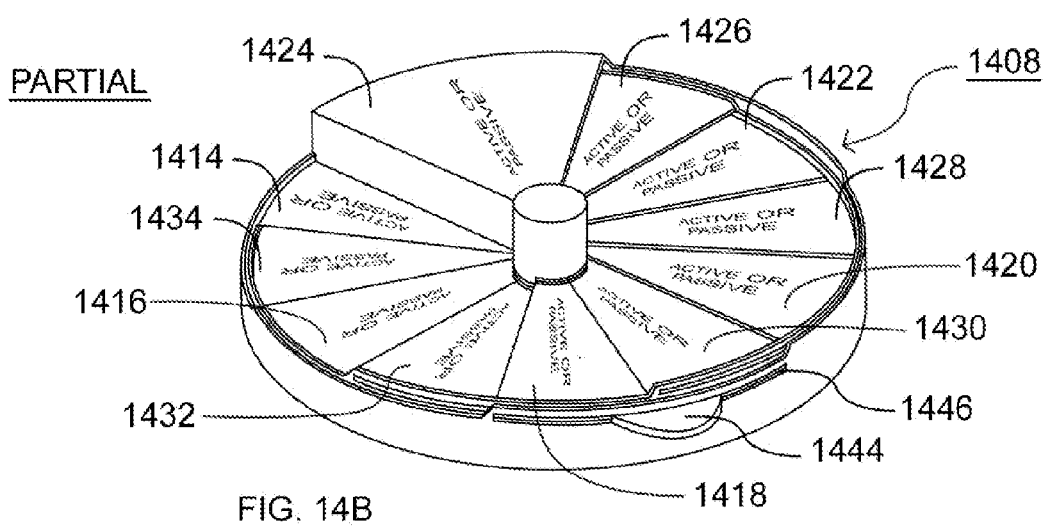
Figure 14C:
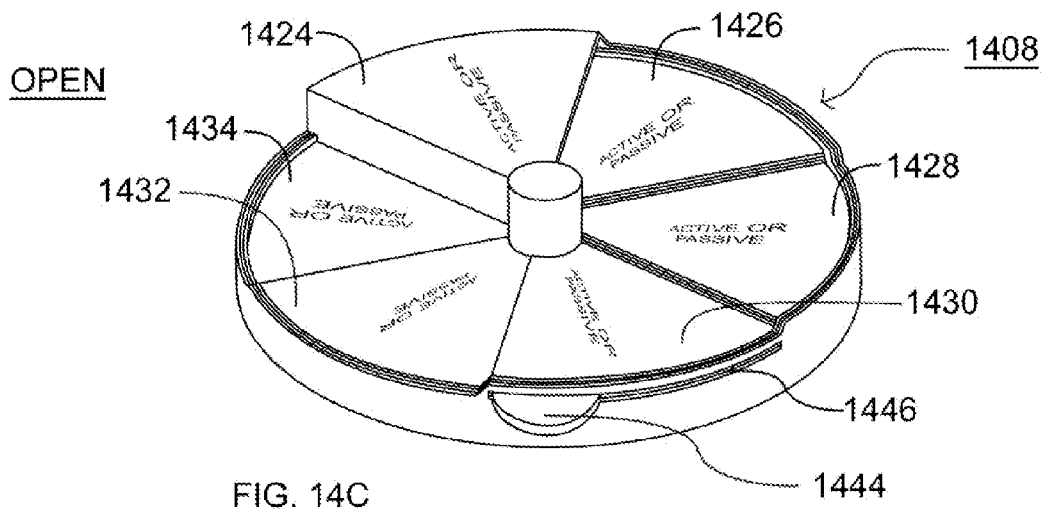

FIGS. 14A, 14B and 14C illustrate a generic embodiment of the present invention having a circular shape, where the cover is shown in the fully closed, partially open and fully open positions, respectively.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention.

DETAILED DESCRIPTION OF THE PREFERRED EMBODIMENTS

Figure 1A:
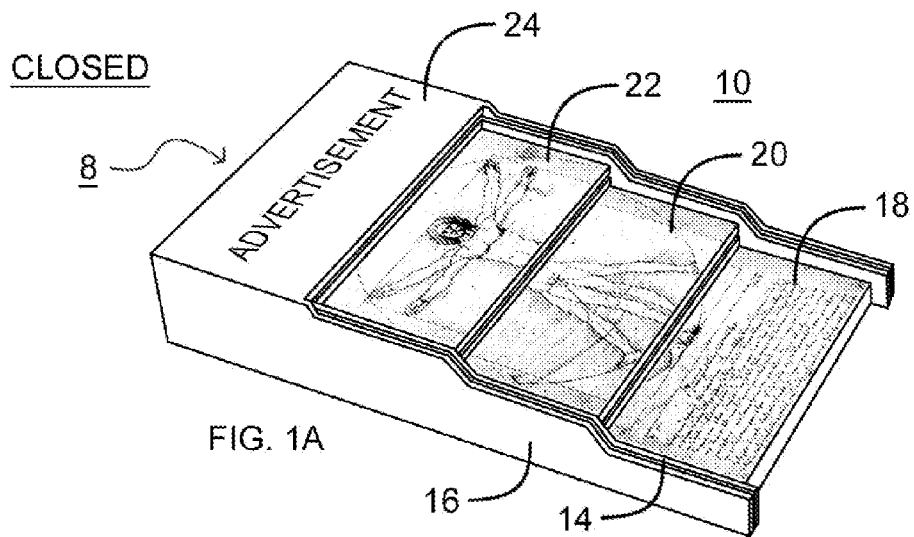
Figure 1B:
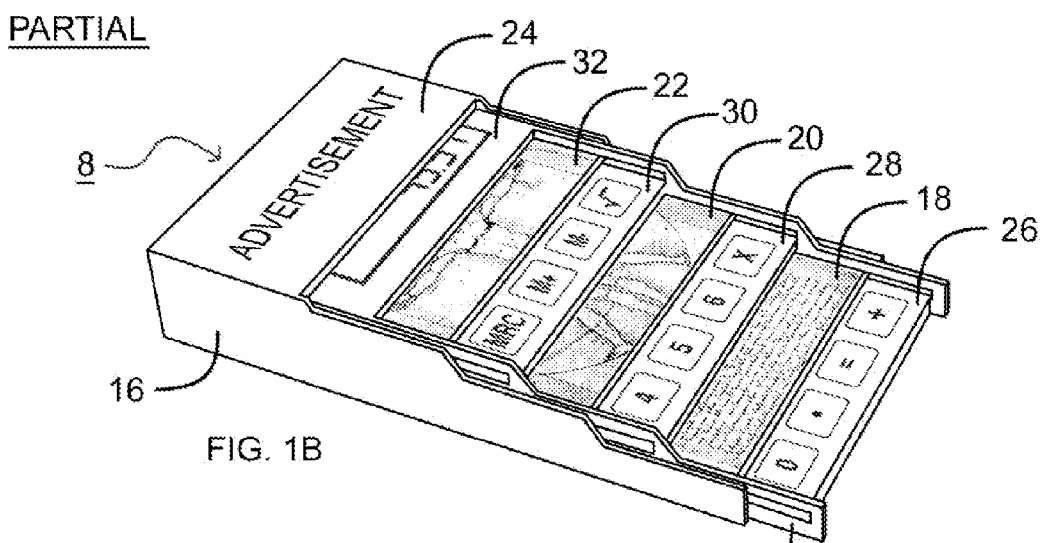
Figure 1C:
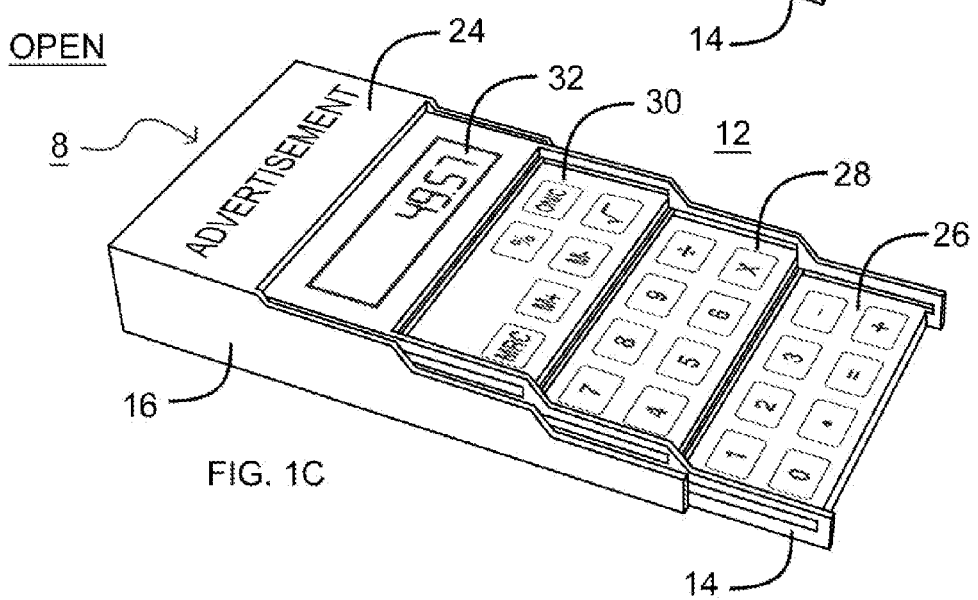

FIGS. 1A, 1B, and 1C illustrate an apparatus 8 of the present invention, having a multi-panel cover component 10 in combination with a multi-panel body or device component 12, where the cover component is shown in the fully closed, partially opened and fully opened positions, respectively, over the device component 12. In one embodiment of the present invention, the device component 12 comprises a handheld or desk calculator, but can comprise any type of device which may benefit from a protective cover that moves in order to gain access to the device or a sub-component thereof For example, when the device component 12 is an electronic device, the sub-components thereof may comprise an LCD display, a solar panel, or keypad, which sub-components may be part of a calculator, PDA (Personal Digital Assistant), a cell phone, a camera, a media player, etc., and if the device component is not electronic, the sub-component may be, for example, a panel with an image or a portion of an image shown thereon. As will be described later, a sub-component of the device can even comprise a compartment which may be selectively opened by movement of a portion of the cover component.

Figure 2A:
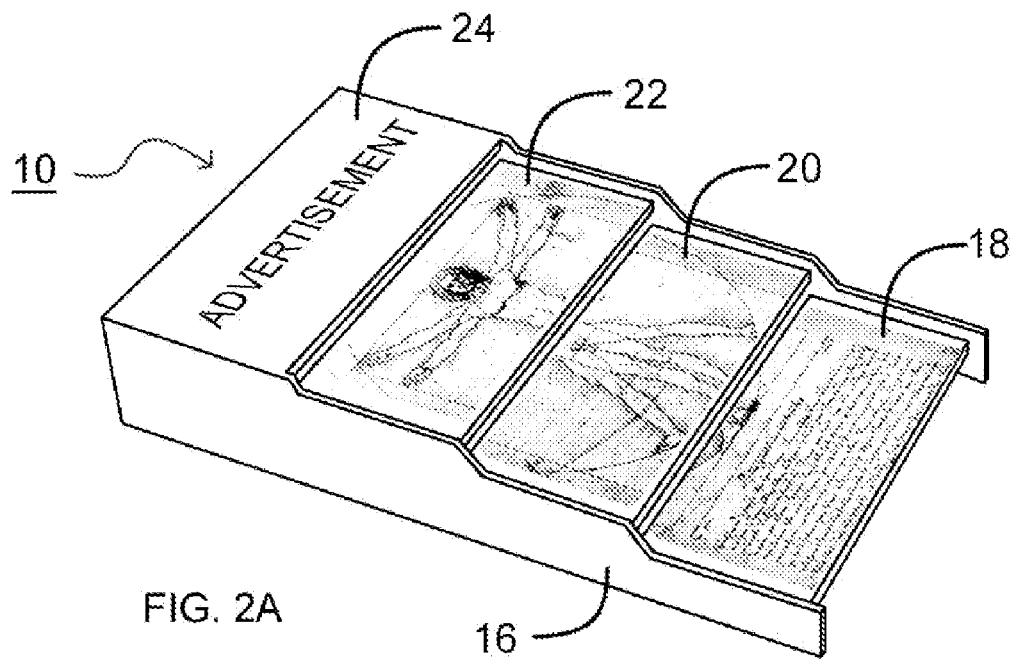
FIGS. 2A and 2B illustrate the cover and calculator portions, respectively, of the FIG. 1 embodiment, separated from each other
Figure 2B:
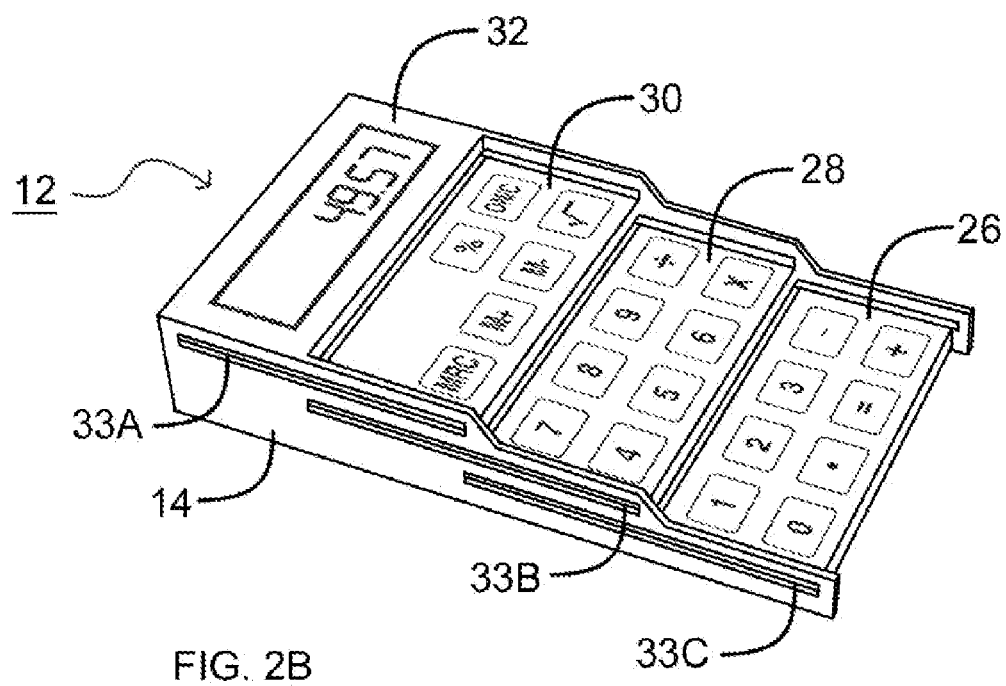

FIGS. 2A and 2B illustrate a sliding multi-panel cover component 10 for the calculator embodiment of apparatus 8. The calculator device component 12 has user operated sub-components supported on a carrier 14 of the device component 12, such well known user operated sub-components including pushbuttons or switches (or even a functional equivalent, such as a function which would be operated by voice recognition), as well as one or more displays, etc. In accordance with one aspect of the present invention, the cover component 10 includes a housing 16 for supporting as sub-components thereof, multiple panels 18, 20, 22 and 24 adjacently positioned in different spatial levels in juxtaposition next to each other, and the device component 12 includes a carrier 14 for supporting as sub-components thereof, multiple panels of 26, 28, 30 and 32 adjacently positioned in different spatial levels in juxtaposition next to each other.

Figure 3A:
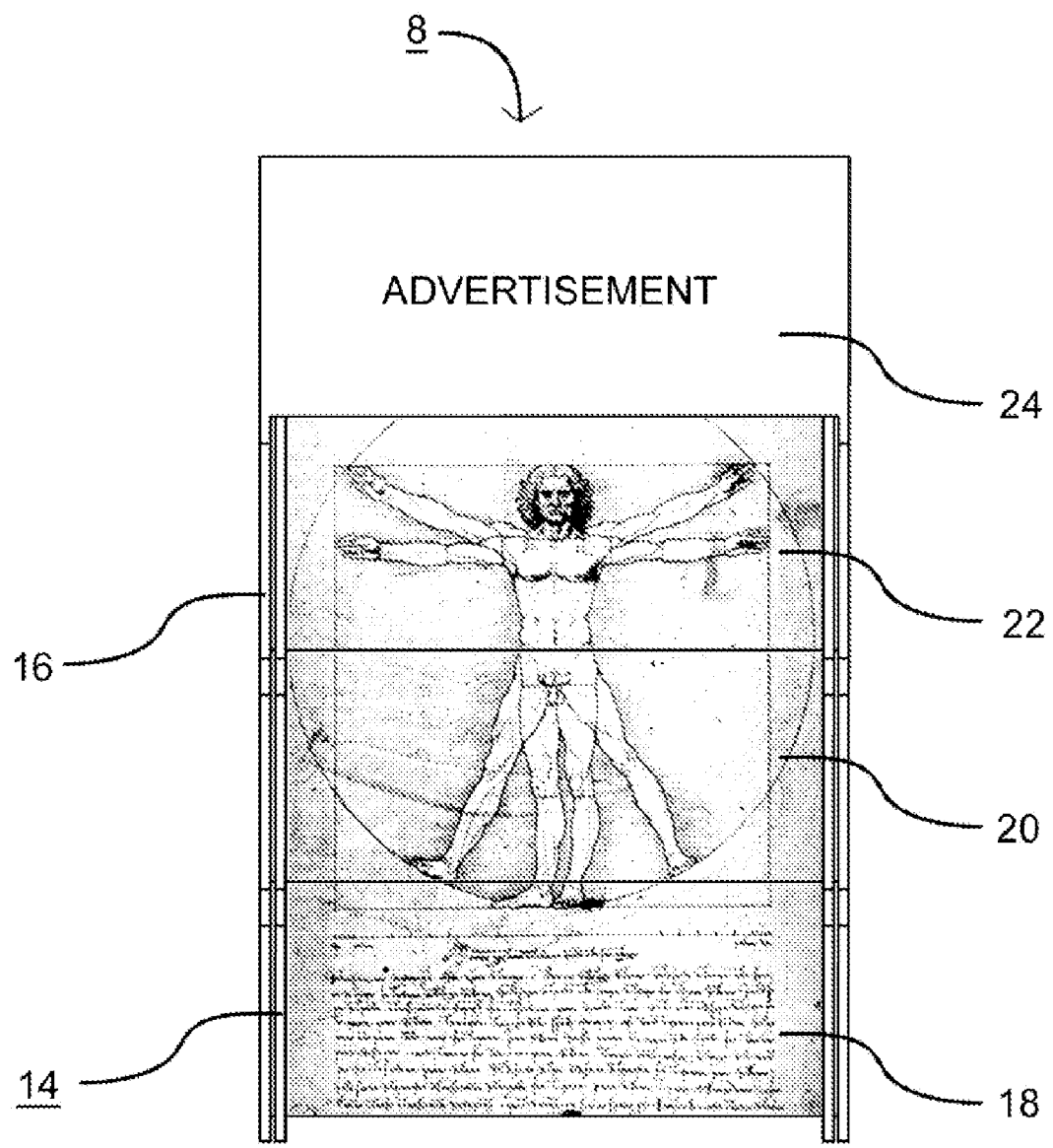
FIGS. 3A and 3B illustrate a top view of the FIG. 1 embodiment in the fully closed and fully open positions, respectively.

FIG. 3A illustrates a top view of the apparatus 8 in which the cover panels are more clearly shown. In the illustrated embodiment, each of the panels 18, 20 and 22 of the cover component 10 comprise a passive display of a partial image which when viewed as a whole, displays a complete image, and panel 24 also comprises a passive display, for example, of an advertising graphic.

Figure 3B:
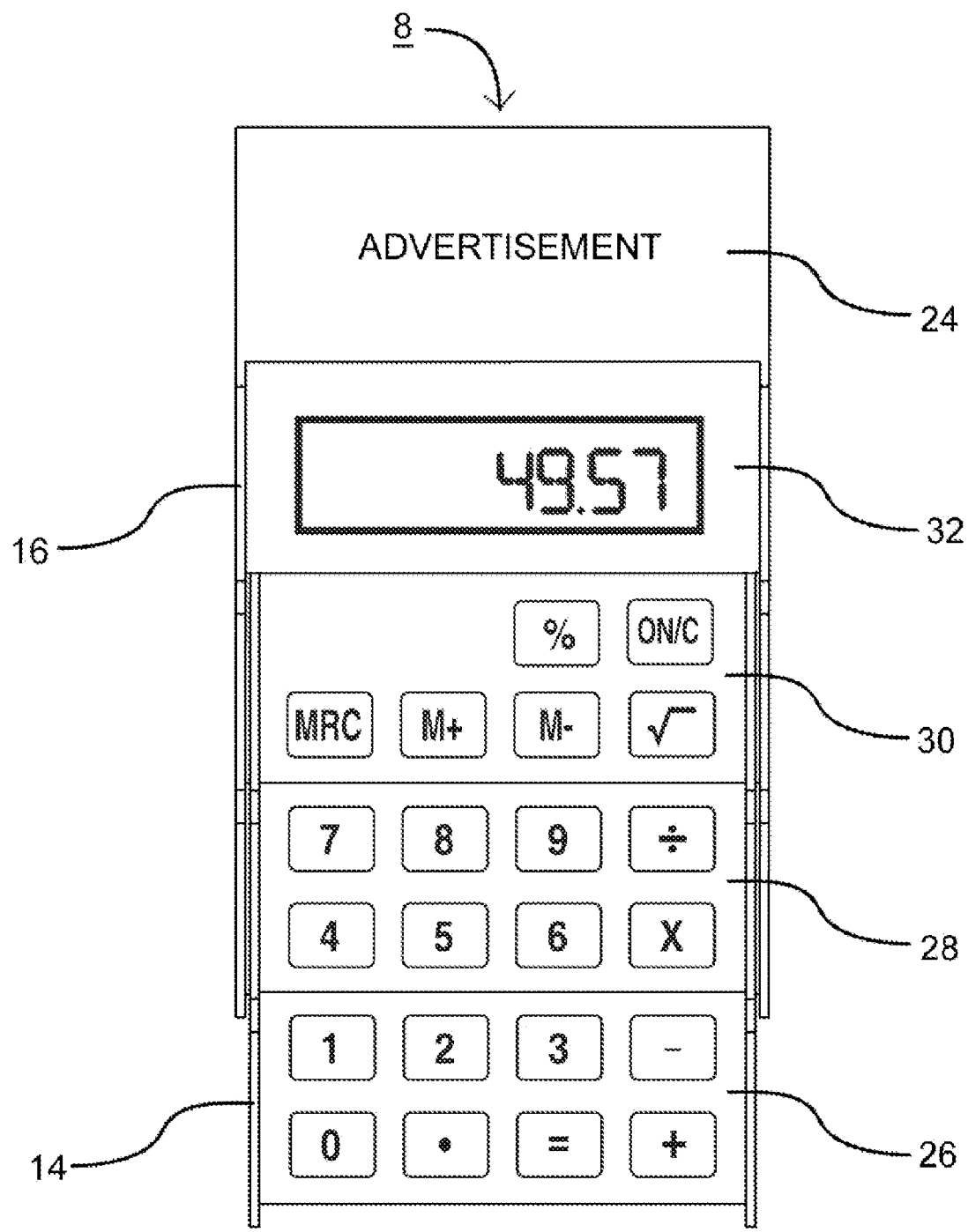

FIG. 3B illustrates a top view of the apparatus 8 in which the panels of the device component 12 are more clearly shown. In the illustrated embodiment, panels 26, 28 and 30 of the device component 12 comprise active sub-components, such as multi-level keyboard panels, and panel 32 comprises an active display sub-component, such as an LCD display.

With continued reference to FIGS. 1A through 3B, the housing 16 of the cover component 10 is slidably joined or connected, or otherwise movably engaged with the carrier 14 of the device component 12, so that as a group, the panels 18-24 of the cover component 10 can be selectively positioned so as to progressively slide over or otherwise change position in relation to the sub-components 26-32 of the device component 12, and thereby serve to protect them or otherwise overlie, conceal or present a different visual or sensory impression when the cover is in the closed position, and be retracted so as to expose or reveal the sub-components 26-32 of the device component 12 when a user wishes to use, view or otherwise interact with or experience the device component 12.

In this illustrated embodiment of the invention, such covering and uncovering provides two different states or functions of the assembly 8 to the user, one state providing an image, and the other state providing a calculator.

It is noted that the sliding movement between the components 10 and 12 as shown in the foregoing Figures, may be accomplished by providing any of several well known mechanical arrangements for maintaining objects in a desired spatial relation to each other throughout a desired range of motion, which in the illustrated embodiment is shown to comprise a "track and groove" arrangement. For example, as shown in FIG. 2B, device carrier 14 includes on an outwardly facing surface thereof a plurality of grooves 33A, 33B and 33C, and the inside facing surface of cover housing 16 includes a corresponding arrangement of ridges (not shown), so as to complete a mechanical connection between the two components which provides the forenoted sliding relationship. The device carrier 14 is dimensioned so as to be positionable interiorly of the cover housing 16, in a manner so that that grooves and tracks engage one another so as to provide the above-noted sliding movement for the respective components. It is noted that it is a matter of design choice to decide which of the components to provide the grooves or the tracks.

The sub-components of the calculator device 12 can then be accessed by manually pulling the lowest end panel away from the cover housing 10. The opening action could also be accomplished utilizing an automatic device. For example, the closing operation of the device could be done by the user manually applying force with his/her finger, which during the closing process compresses springs (not shown) located between the device carrier and housing cover. Thereafter, the energy of the compressed springs could be used to assist or automatically open the device upon activation, for example, by the user pressing a button that releases a latch mechanism located between the device carrier and housing cover. Other types of automatic and assisted devices are possible in addition to or in place of springs, such as torsion rods or other mechanically, hydraulically or pneumatically deformable or tensionable members.

While in the closed position, a portion, up to and including no portion, of the calculator panels may be visible, how much is visible is a matter of design choice. The opening action of the cover reveals a fully functional calculator, with manual access for the user to the buttons and visibility of the LCD display. The sliding panels can be arranged so as to be in ascending or descending order as the cover is opened, but in either case, the result of going from fully open to fully closed, or vice versa, is that the graphic image area formed by panels 18-22 can change with much less space needed for movement of the panels of the cover than if the cover and the device components were not arranged in an interleaved multi-panel manner.

Figure 4A:
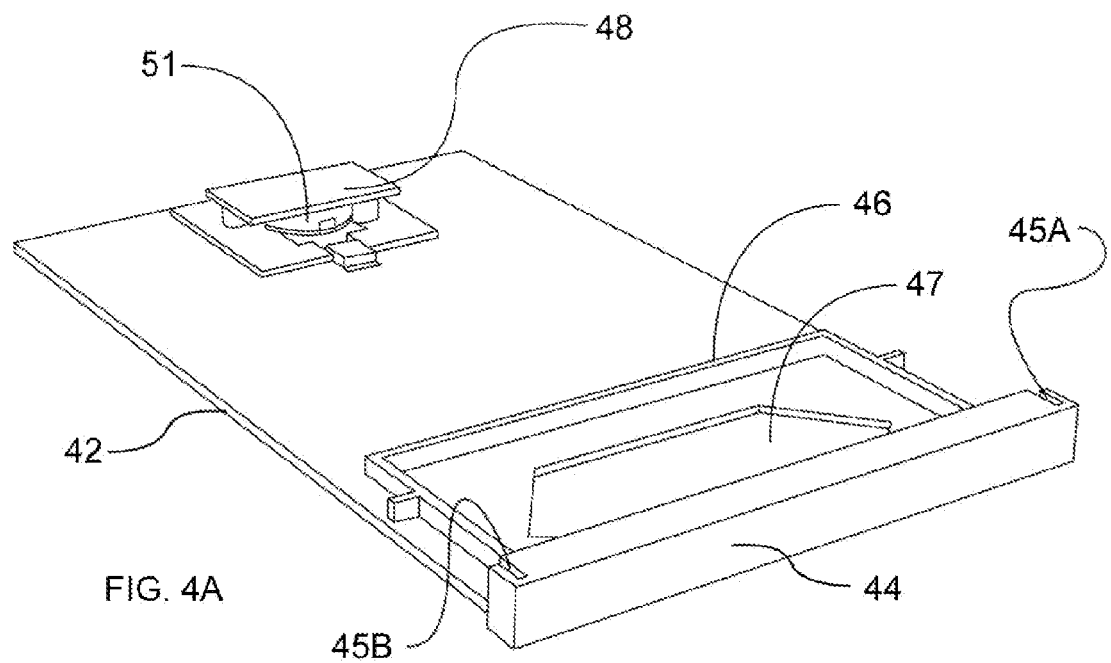
FIGS. 4A, 4B and 4C illustrate assembly steps for one technique of manufacturing the calculator body component of the apparatus.
Figure 4B:
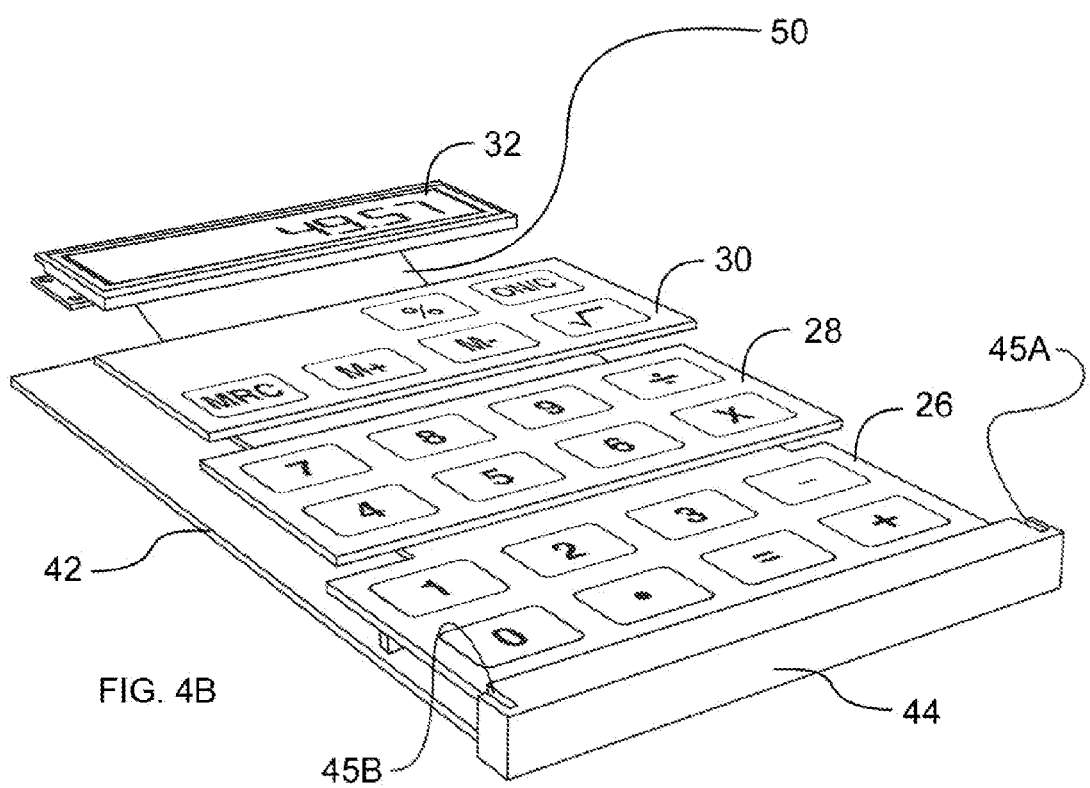
Figure 4C:
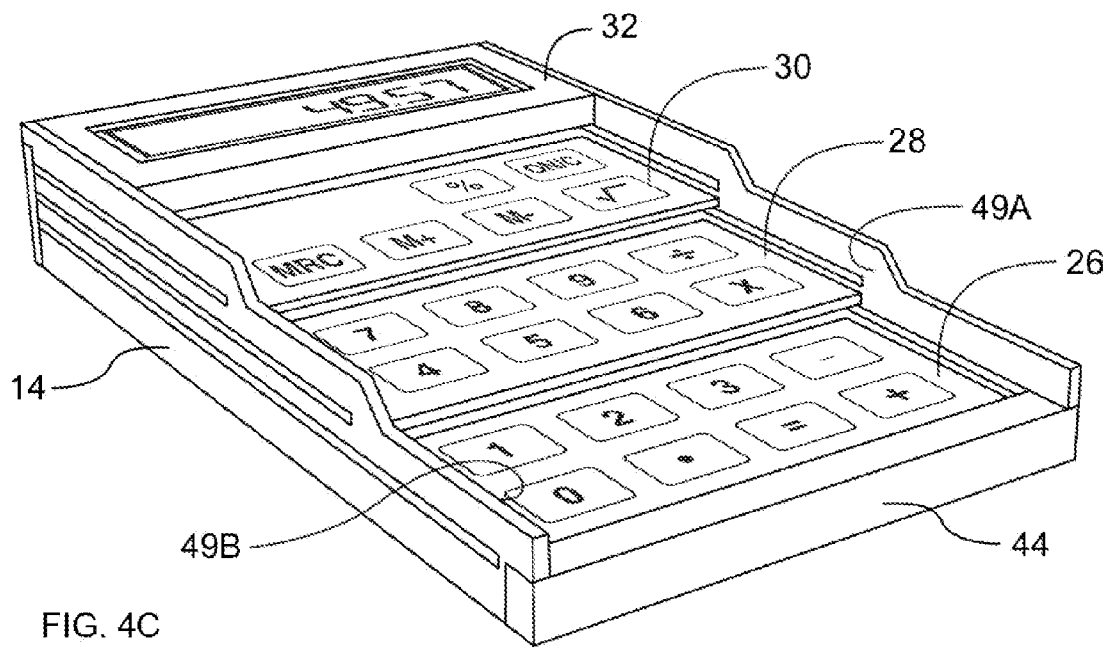

FIGS. 4A, 4B and 4C illustrate one technique for manufacturing the device component 12 of the apparatus 8. A carrier base 42, which may be formed of a plastic material, includes a front portion 44 positioned at its front end, which not only provides structural rigidity to the assembly 8, but also provides, via slots 45A and 45B formed at its opposed ends, an attachment point for receiving a front facing edge of sidewalls 14 of sub-component 12. Wall portions 46 are positioned on a top surface of base 42 for having, for example, the panel 26 mounted thereon, in raised manner. A cutout 47 is formed in base 42 between front portion 44 and wall portions 46, so that a user can insert a finger tip into the cutout 47 in order to manually effectuate the sliding relative movement between the subcomponents of the assembly 8. As shown in FIGS. 4B and 4C, the panels 26, 28 and 30, in the depicted example forming subcomponents of a calculator, are positioned on carrier base 42 so as to be in multiple elevated levels, and are held in place, for example, by attachment at their outer edges to the inside facing portions 49A and 49B of the left and right sidewalls 14. A battery compartment 48 is provided at a rear end of base 42 for holding a battery 51 therein, for providing power to the device component 12. In one embodiment, a ribbon cable 50 provides an electrical connection between the electrical sub-components 26-32 of the calculator device. In an alternative embodiment, any type of electrical coupling could be used, such as discrete wires, direct physical electrical connections between the battery and the active components of the adjacent panels, or even wireless connections.

Figure 5:
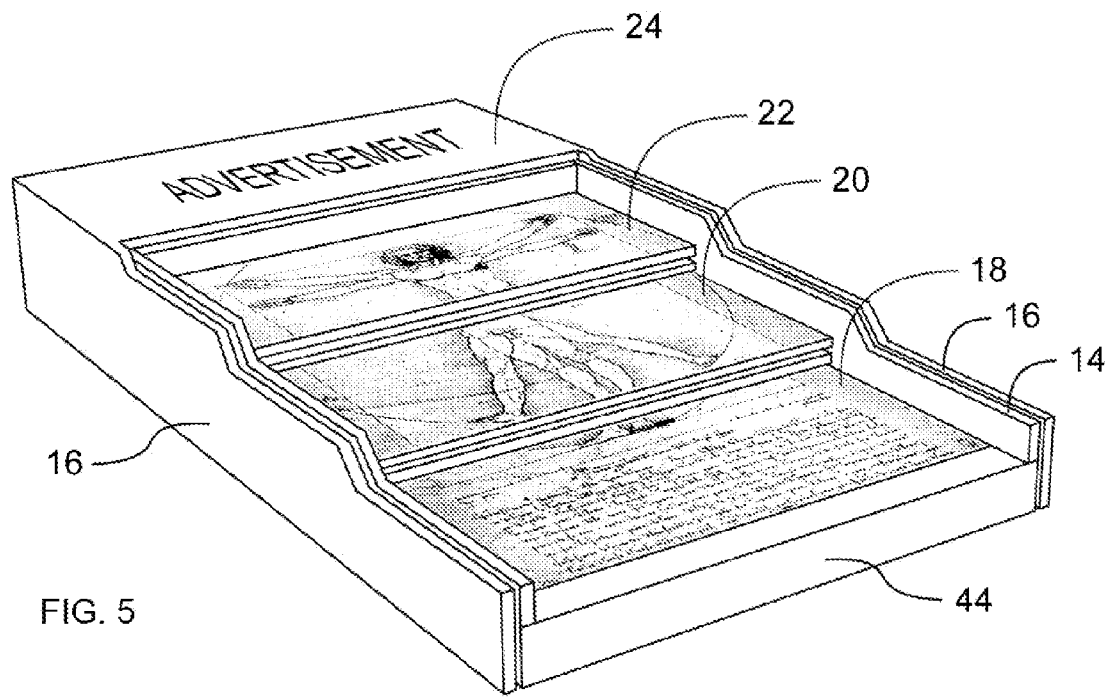
FIG. 5 illustrates the nested assembly of the body component with cover component of the finished apparatus.

FIG. 5 illustrates the nested assembly of the body component with cover component of the finished apparatus, in the "closed" (or a first) position.

It is to be understood that although in one embodiment of the invention, the body component of the device 8 is electronic, non-electronic devices could also benefit just as well from the invention.

Figure 6A:
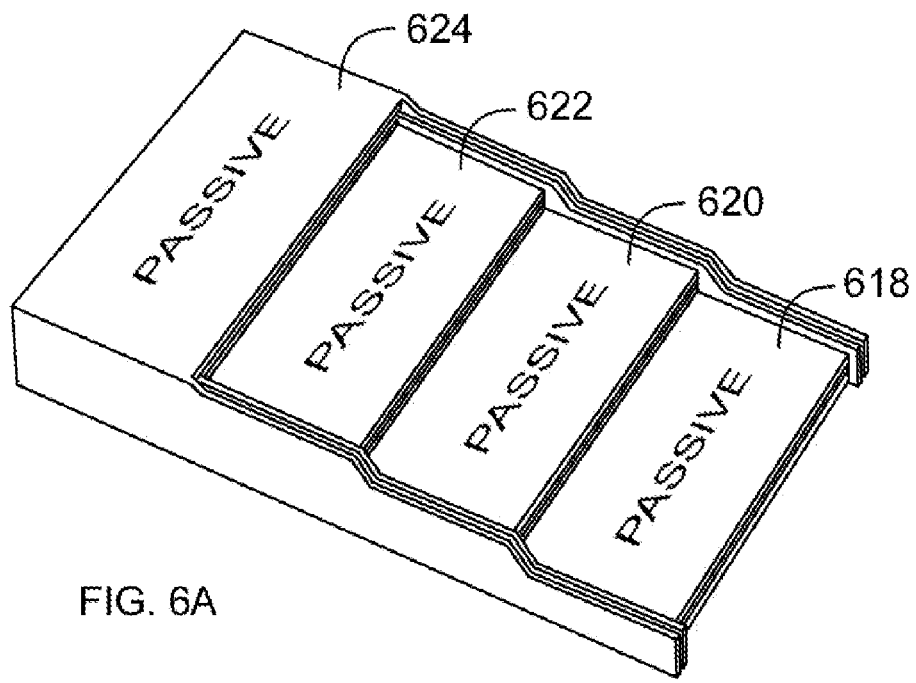
FIGS. 6A and 6B illustrate perspective views of closed and opened positions, respectively, of another alternative embodiment of an apparatus in accordance with the invention, where the cover component comprises panels of passive components, such as images, and the body component comprises panels of active components, such as keyboards and displays.
Figure 6B:
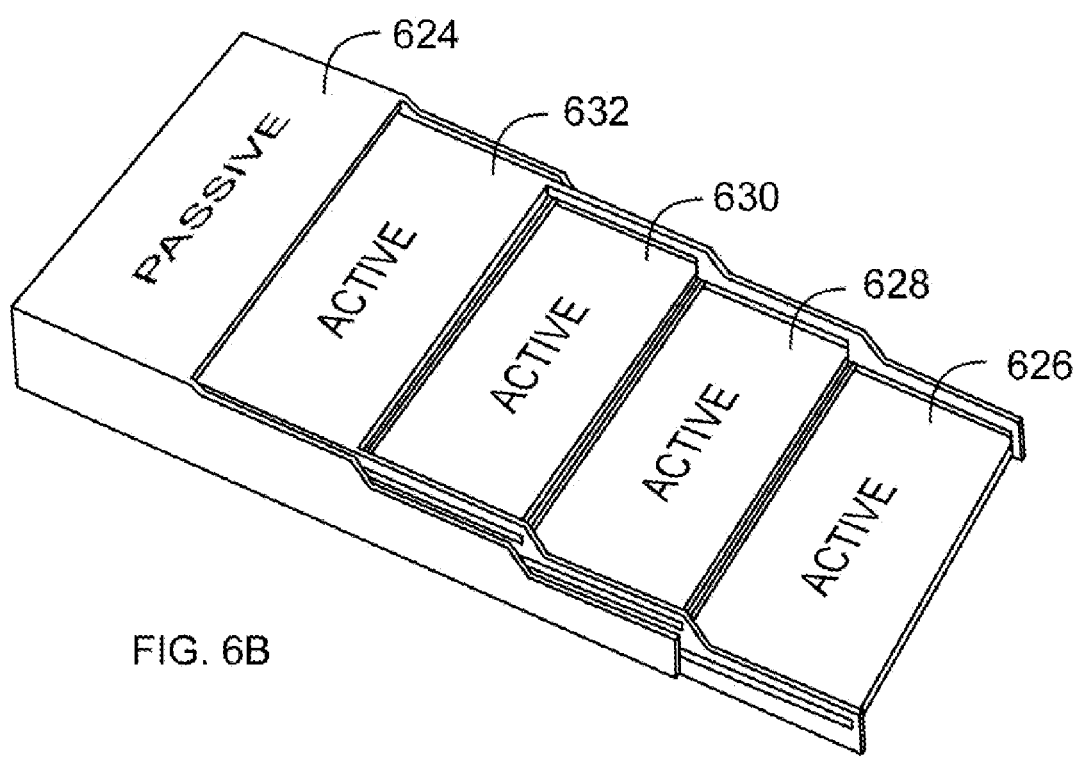

In this regard, FIGS. 6A and 6B illustrate perspective views of closed and opened (first and second) positions, respectively, of another embodiment of an apparatus in accordance with the invention, where the cover component comprises panels 618-624 of passive components, such as images, and the body component comprises panels 626-632 of active components, such as keyboards and displays.

Figure 7A:
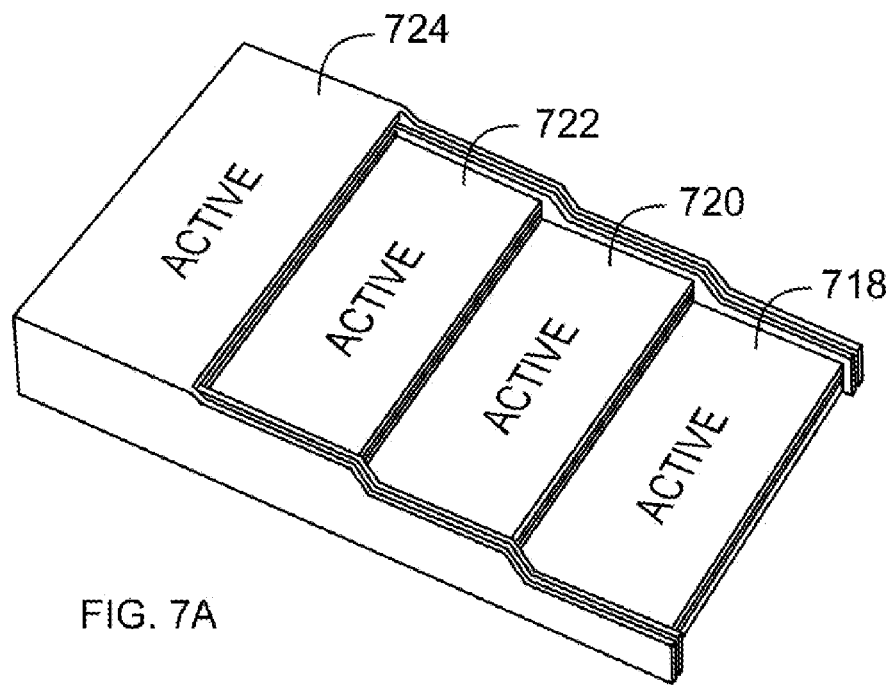
FIGS. 7A and 7B illustrate perspective views of closed and opened positions, respectively, of another alternative embodiment of an apparatus in accordance with the invention, where both of the cover and body components comprise panels of active components such as keyboards and displays.
Figure 7B:
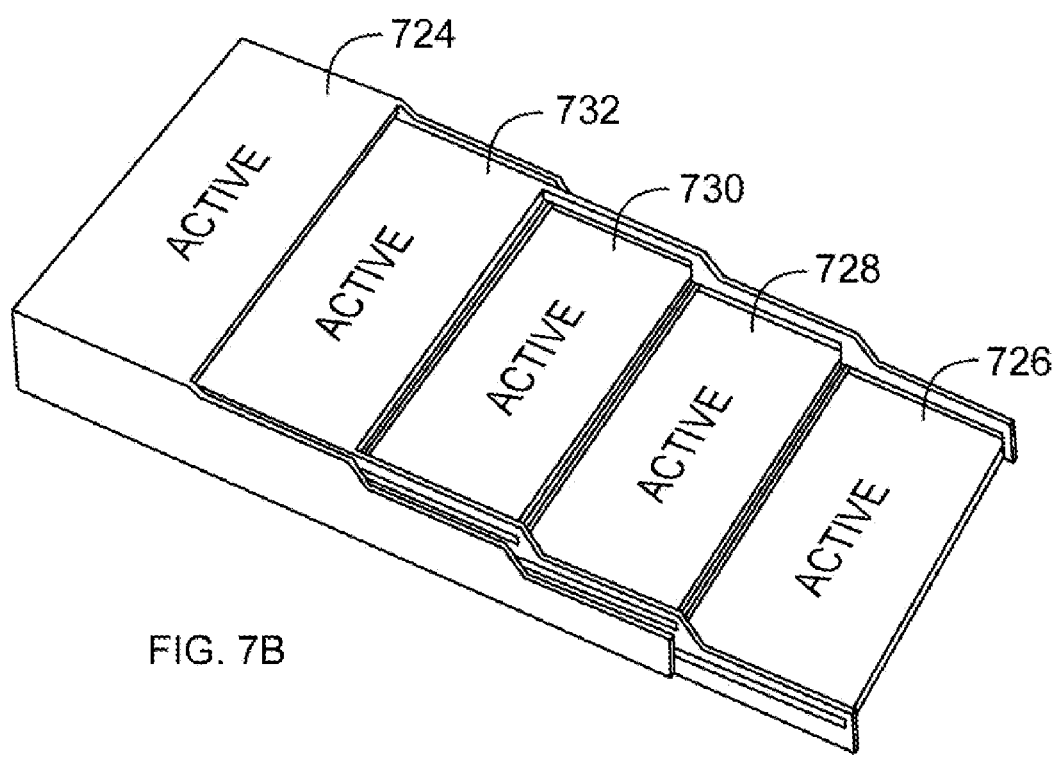

FIGS. 7A and 7B illustrate perspective views of closed and opened (first and second) positions, respectively, of another alternative embodiment of an apparatus in accordance with the invention, where both of the cover component panels 718-724 and the body component panels 726-732 comprise active components, such as keyboards and displays.

Figure 8A:
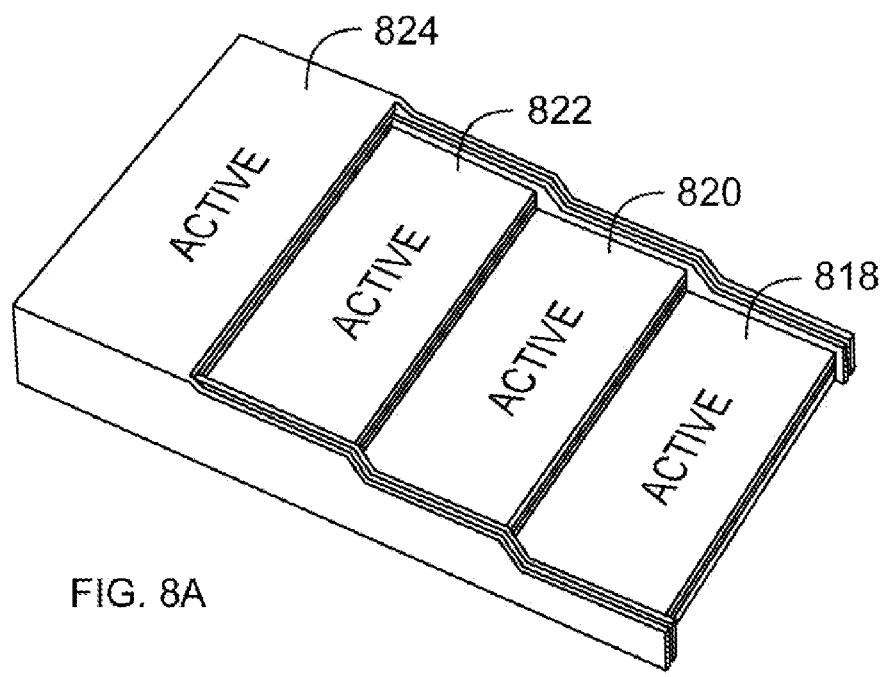
FIGS. 8A and 8B illustrate perspective views of closed and opened positions, respectively, of another alternative embodiment of and apparatus in accordance with the invention, where the cover component comprises panels of active components, such as keyboards and displays, and the body component comprises panels of passive components, such as images.
Figure 8B:
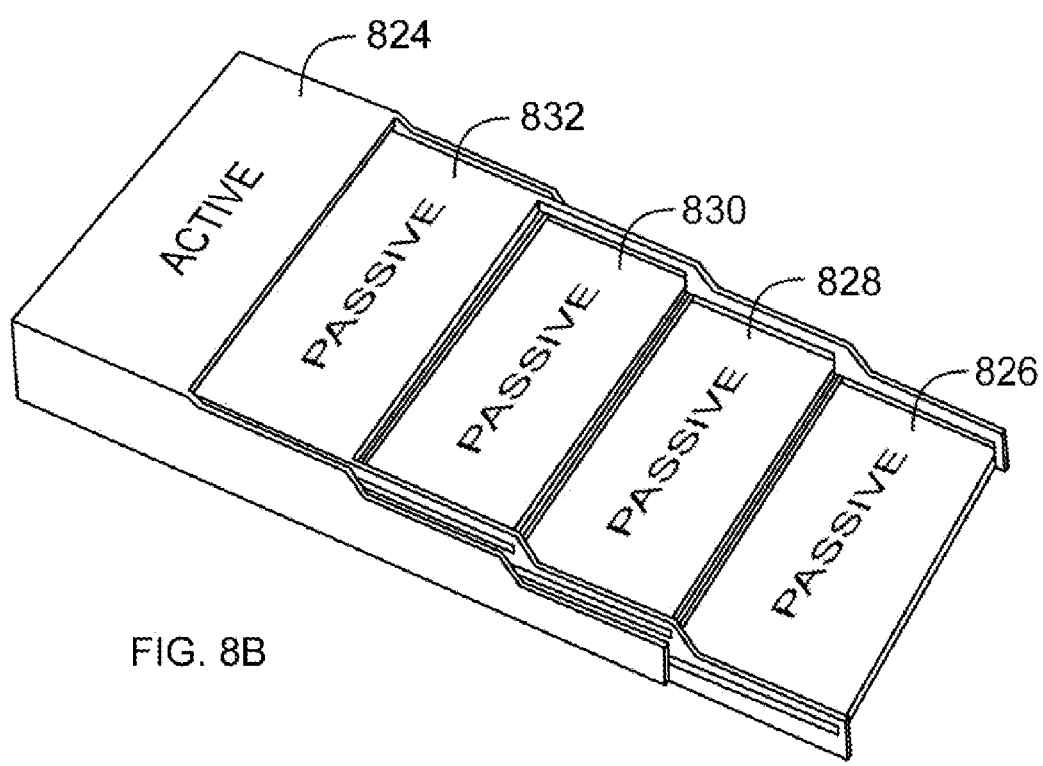

FIGS. 8A and 8B illustrate perspective views of closed and opened (first and second) positions, respectively, of another alternative embodiment of an apparatus in accordance with the invention, where the cover component comprises panels 818-824 of active components, such as keyboards and displays and the body component comprises panels 826-832 of passive components, such as images.

As was described in the embodiment shown in FIGS. 2A and 2B, the user operated sub-components of the device component 12, were positioned in a segmented multi-level manner on the carrier 14 of the device component 12, where the size and shape of the sub-components 26-32 are dimensioned so as to substantially correspond to the size and shape of the multiple sub-components 18-24 of the cover, so that when the cover moves to the closed position, the individual sub-components 18-24 of the cover slide over, and therefore completely cover or hide from view, the sub-components 26-32 of the device. In an alternative embodiment, the panels of the device component 12, for example, may not substantially correspond to the size and shape of the multiple sub-components 18-24 of the cover, so as to not completely cover or hide from view an image on the multiple sub-components 18-24 of the cover component.

Figure 9A:
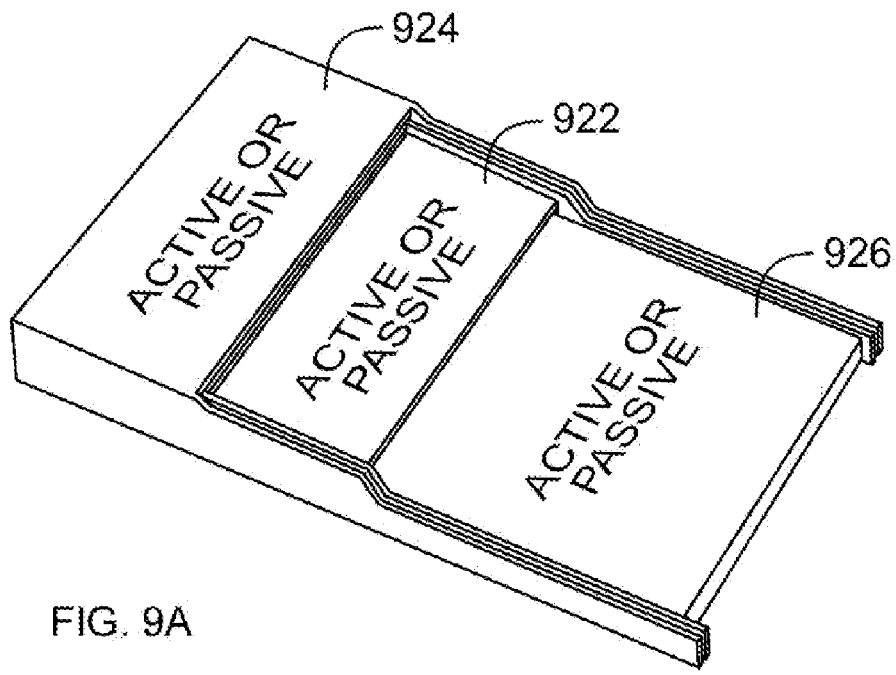
FIGS. 9A and 9B illustrate perspective views of closed and opened, positions, respectively, of another alternative embodiment of an apparatus in accordance with the invention, where the multiple panels of the body component are not all uniformly sized.
Figure 9B:
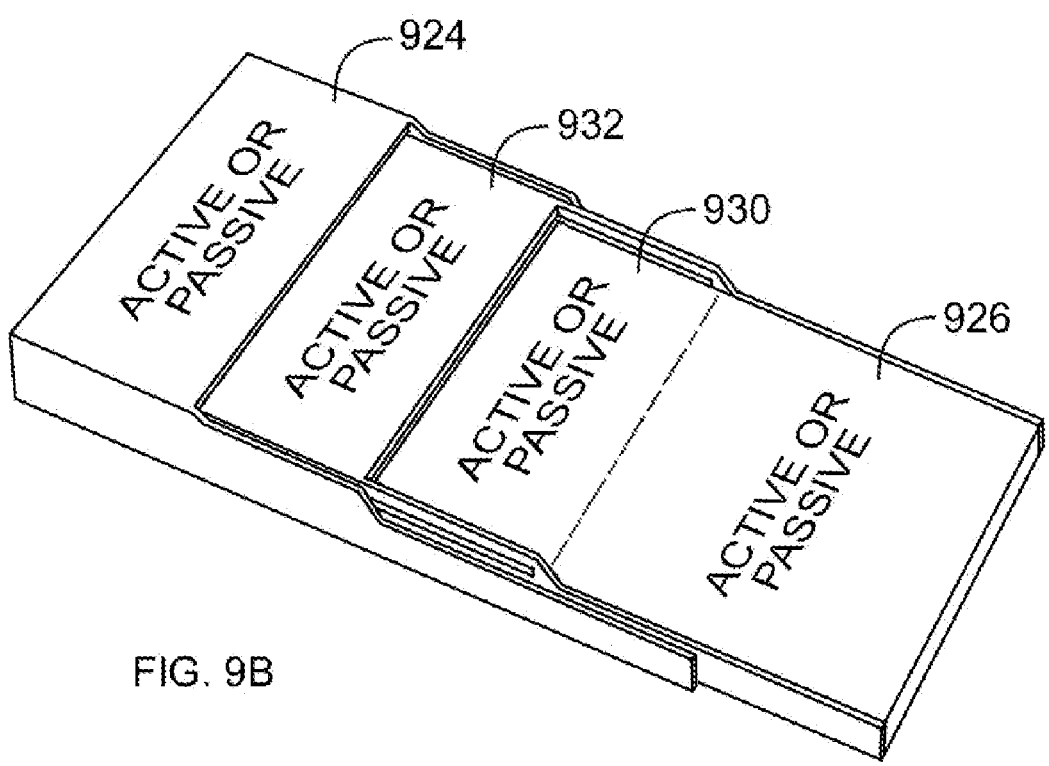

In this regard, FIGS. 9A and 9B illustrate perspective views of closed and opened (first and second) positions, respectively, of another alternative embodiment of an apparatus in accordance with the invention, where multiple panels 926 and 932 of the body component are not all uniformly sized. More specifically, the forward-most sub-component panel 926 of the body component is shown as having the same dimension into the depth of the device 8 as the three (3) body component panels 26, 28 and 30 of the FIG. 1 embodiments. This alternative embodiment, however, still retains the advantages of the prior disclosed embodiments, in that the rearward-most portion 930 of the body component panel 926 still receives protection from a cover component panel when the device is closed, and portion 930 is exposed or revealed for user access when the device is opened. Additionally, cover component panels 922 and 924 function to cover and not cover respective body component panels 930 and 932 in the same manner as cover component panels 22 and 24 functioned to cover and not cover respective body component panels 30 and 32 in the previously described embodiments. Although in FIGS. 9A and 9B panels having different "depths" are disclosed, it is noted that other changes in size and shape are also possible. For example, as an alternative to the embodiment shown in FIGS. 1A-1C, the panels of the calculator component may be narrower than the full width of the panels of the cover component, so that even in the opened position, a portion of the images presented by the cover component are still visible to the user.

In a similar manner, it is noted that in FIGS. 6A through 8B, the size and shape of the body panels corresponded with the size and shape of the cover panels. In an alternative embodiment, the size and shape of the respective component panels shown in FIGS. 6A through 8B may not be correspondingly sized and shaped.

Figure 10A:
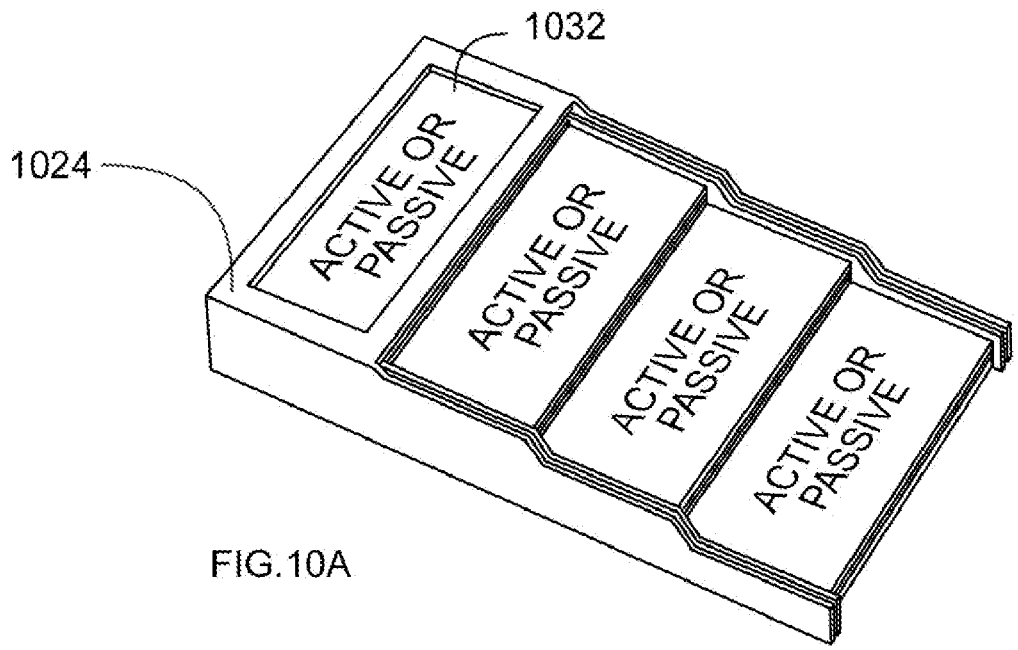
FIGS. 10A and 10B illustrate perspective views of closed and opened positions, respectively, of another alternative embodiment of an apparatus in accordance with the invention, where movement from the closed position to the open position of the apparatus, causes one of the plurality of panels of the body component to reveal a storage compartment as a passive component of said cover component.
Figure 10B:
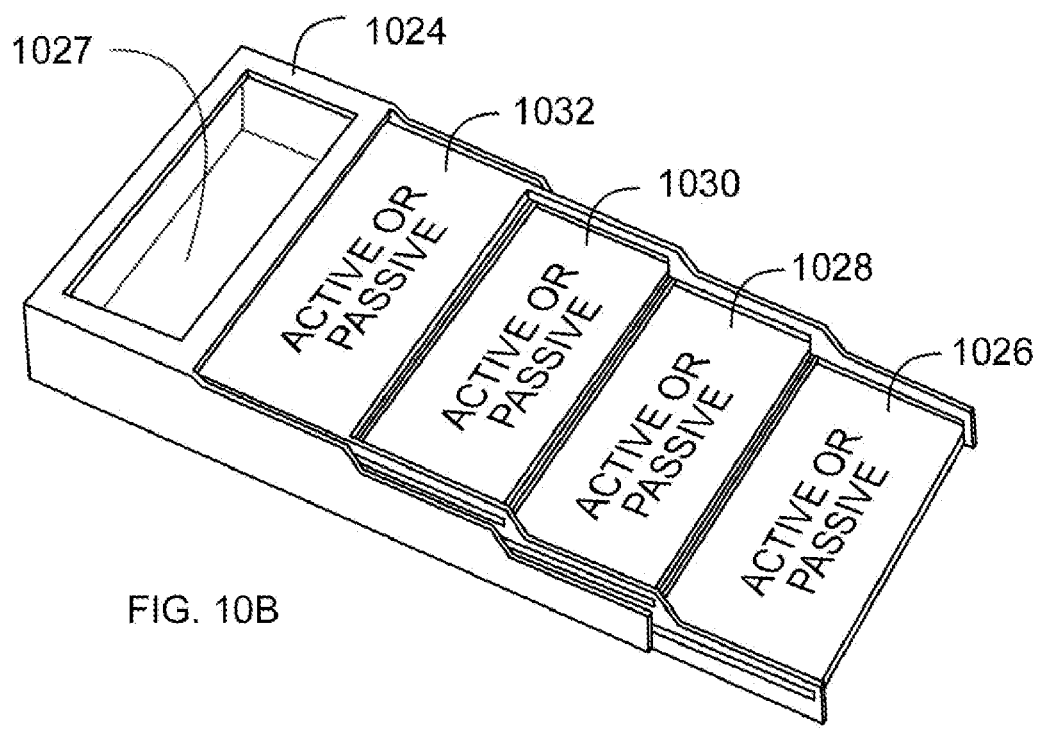
Figure 11A:
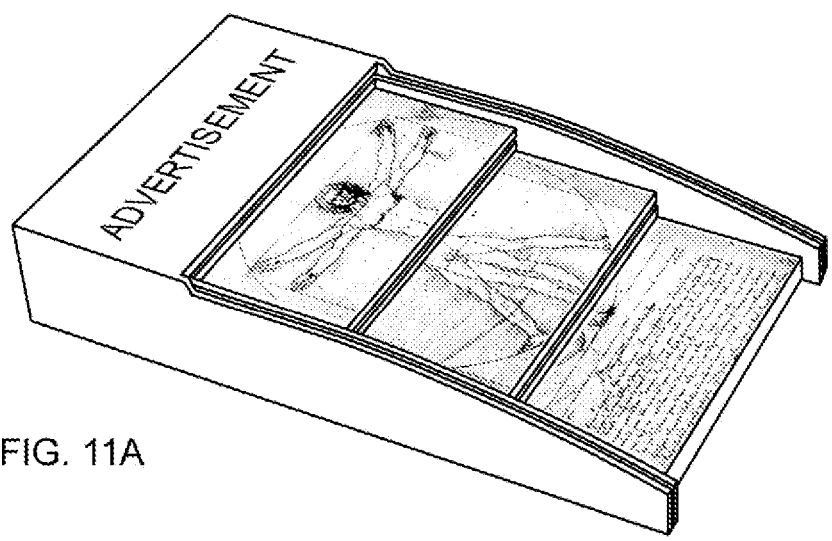
Figure 11B:
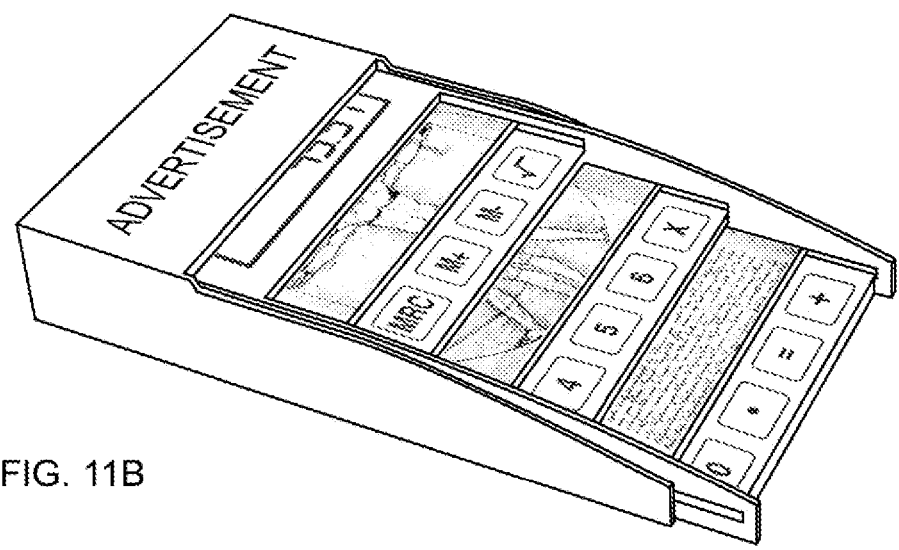
Figure 11C:
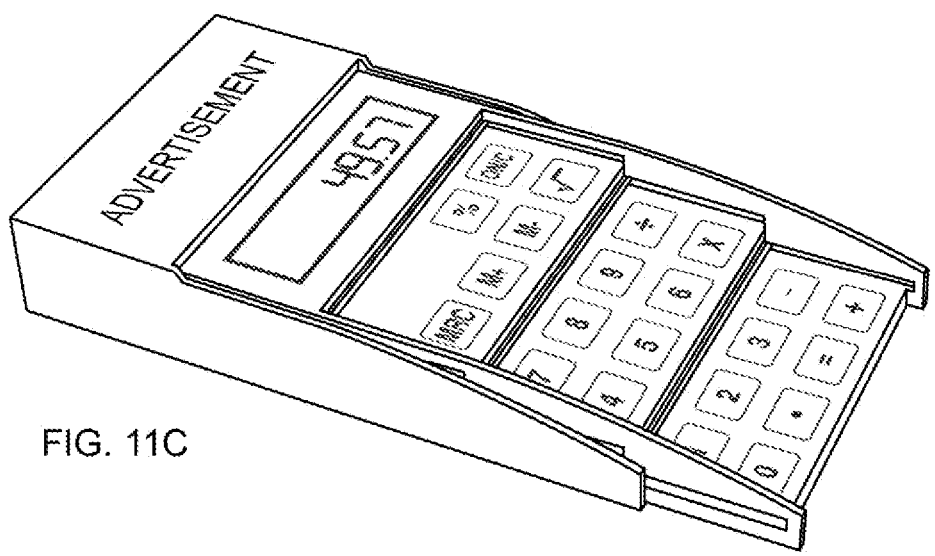
Figure 12A:
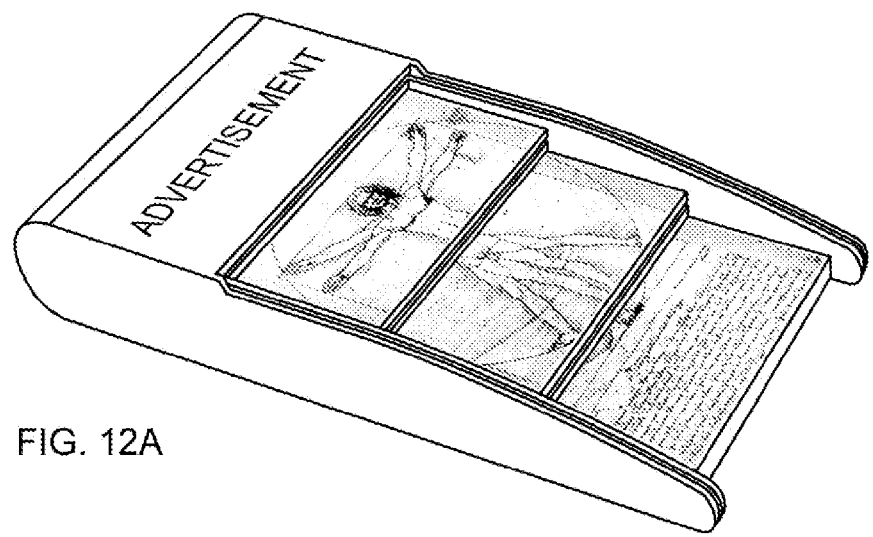
Figure 12B:
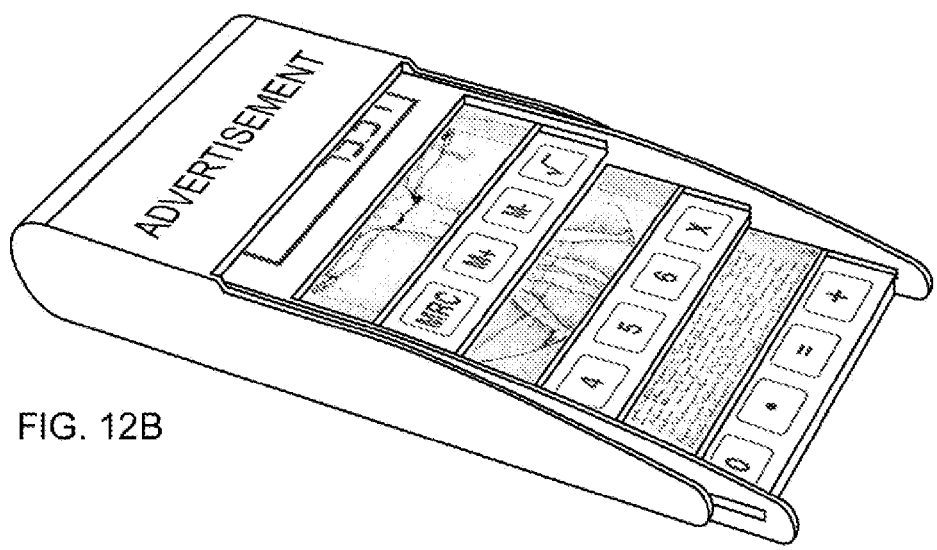
Figure 12C:
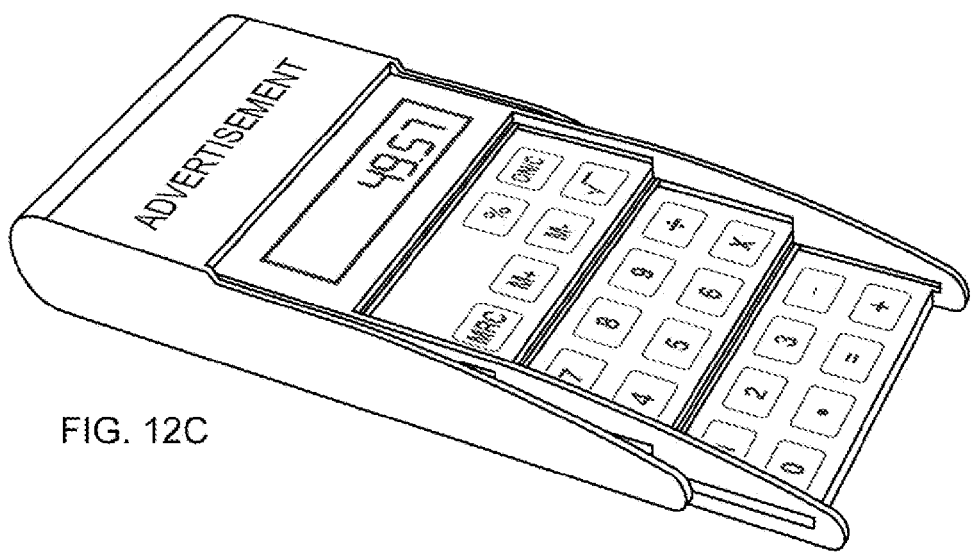
Figure 13A:
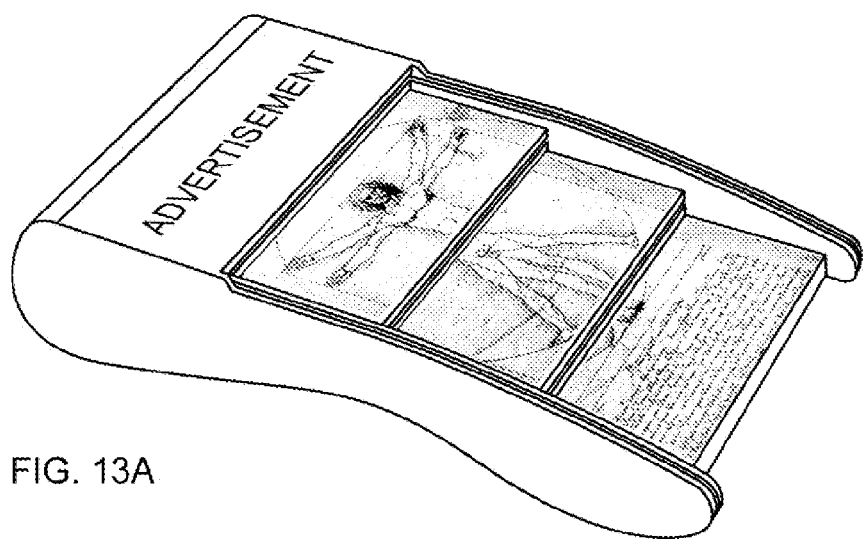
Figure 13B:
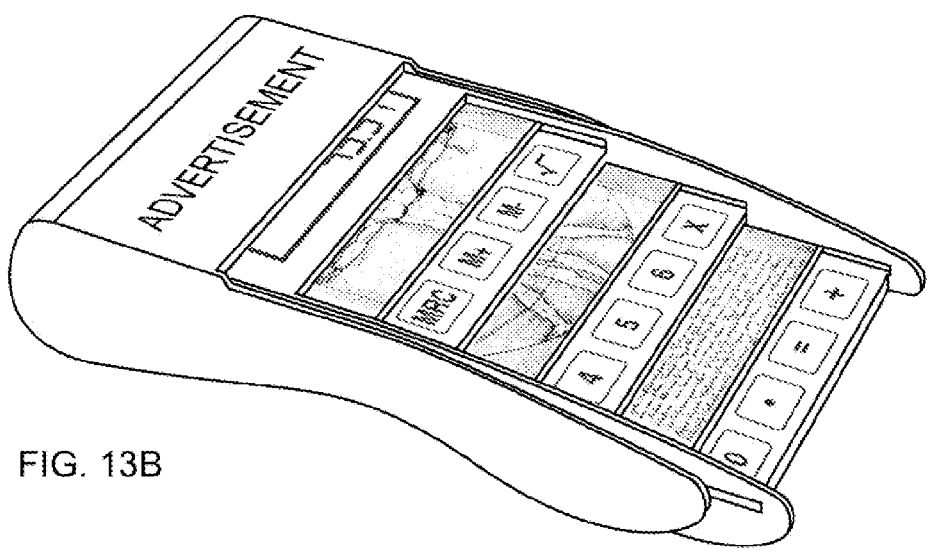
Figure 13C:
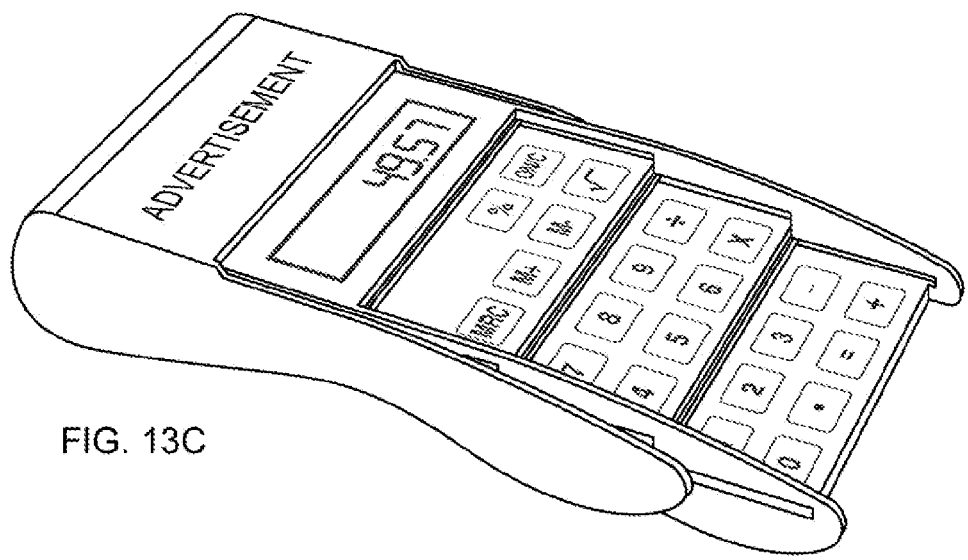

FIGS. 10A and 10B illustrate perspective views of closed and opened (First and second) positions, respectively, of another alternative embodiment of an apparatus in accordance with the invention, wherein movement from the closed position to the opened position of the apparatus, causes a panel 1032 of the plurality of panels 1026-1032 of the body component to reveal a storage compartment 1027 as a passive component. More specifically, the topmost panel of cover component 10 includes a frame portion 1024, which cooperates with the topmost panel 1032 of the body component 12, so that panel 1032 provides a cover over the storage compartment 1027 when the device is closed, and moves so as to provide a user of the device 8 access to the storage compartment 1027 when the device is in the opened position. For example, the device could comprise a multi-part container having a plurality of separate storage volumes, whereby one storage volume could be for holding one or more doses of a medication, while other ones of the storage volumes could be for holding dosage or other user information. By sliding the cover open, the user gains access to the medication as well as the dosage information.

Although in the illustrated embodiments sub-components 18-24 of the cover are positioned on the carrier 16 in multiple levels having a gap therebetween, in accordance with a further aspect of the invention, the sub-components 18-24 of the cover may all be co-planar, in that they are formed as a single layer, but have a gap between adjacent ones of the sub-components 18-24 so as to allow respective ones of the multiple level device sub-components 26-32 to pass therethrough. This would require some flexibility or similar technique in order to allow the cover sub-components 18-24 to enter the gaps between, and spatially conform to, the multiple-level sub-components 26-32 of the device, so as to provide an effective cover thereover.

In a further alternative embodiment, the cover component may provide the multi-level structure for assembly 8, while the device 12 may be formed on a single plane.=

FIGS. 11A, 11B, 11C, 12A, 12B, 12C, 13A, 13B, and 13C, all illustrate examples of a calculator embodiment of the present invention, having a cover shown in the fully closed, partially opened and fully opened positions, respectively whereby the overall shape of each of the calculator embodiments is different.

While the forenoted illustrated examples depict generally linear directional motion between the components of the assembly 8 to effect the transition from a first relative position to a second relative position, other directional motions are contemplated, such as rotational or angular motion between the components so as to effect a change in state, function or appearance of the assembly.

In this regard, FIGS. 14A, 14B and 14C illustrate a generic embodiment of the present invention having a circular shape, wherein the cover is shown in the fully closed, partially opened and fully opened positions, respectively, as a result of rotational relative motion between the cover and body components.

It is noted that other electronic and even non-electronic devices are anticipated to be used in this invention. More specifically, in accordance with the teachings herein, multiple electronic devices can form the movable components to provide a multi-function device, such as for example a cell phone (or PDA, a computer, a remote control device, such as for a television, a storage area, etc) in one position and a calculator or media player (such as an mp3 player, or video or game player, or a camera, etc.) in a second position. Such an embodiment permits two devices with two separate user interfaces to be readily constructed in a form factor that is size and shape efficient while reducing or eliminating the need for a single device to perform different functions through a single form factor and/or device interface, such as a combination cell phone/media player that require a complicated or visually crowded user interface to carry out even the most basic and necessary functions of the multiple devices.

Many advantages are provided by the forenoted arrangements, such as, but not limited to:
(1) the panels of the cover component may serve to conceal and/or protect access to the panels of the body component when the body component is not in use.
(2) the panels of the cover and body components may provide an interesting space for positioning an advertising message or other graphics or images to the user of the device. Such panels also allow for the possibility of the user to personalize one or more of the panels.
(3) the provision of the relative movement between the panels of the cover and body components may create an exciting or visually appealing change in state or function of the device.
(4) a minimal amount of space is used to achieve the change in state or function, and
(5) the arrangement provides a "two-for-one" provision of functionality in that the space needed to provide two functionalities is provided in only slightly more than the space needed to provide a single one of the functionalities.

Thus, embodiments of the disclosure described above make multi-purpose use of a structure or device facilitated by a user's movement of a portion of the structure or device from a first position to a second or third or further position or positions, the movement revealing or exposing or making available alternate aspects of the device or structure so as to provide differing visual images, experiences or functions to the user as a result thereof.

While this invention has been particularly shown and described with references to preferred embodiments thereof, it will be understood by those skilled in the art that various changes in form and details may be made therein without departing from the sphere and scope of the invention. In fact, many such changes are already noted in this description but it should be realized that the above-noted changes were not exhaustive, and merely exemplary. For example, although it is noted that the panels of the cover component may provide both a "protective" and "hiding" function for multiple panels of the device component, one or both of these qualities is not necessary for the invention. For example, if one or more of the cover panels were clear, in the covering position they may serve to protect, but not hide, multiple panels of the device component. Similarly, if one or more of the cover panels were porous, in the covering position they may not serve to protect multiple panels of the device component from, for example, a spill of liquid. Those skilled in the art will recognize, or be able to ascertain using no more than routine experimentation, many equivalents to the specific embodiments of the invention described herein.

Thus, there has been provided in accordance several aspects of the invention, a method and apparatus to achieve an exciting visual effect or provide additional image or information, when moving a cover panel on a device, which fully satisfies the objects, aims and advantages set forth above. While the invention has been described in conjunction with specific embodiments thereof, it is evident that many further alternatives, modifications and variations will be apparent to those skilled in the art in light of the foregoing description. Accordingly, it is intended to embrace all such alternatives, modifications and variations as falling within the spirit and broad scope of the invention.

The invention claimed is:

1. Apparatus, comprising:
a cover component formed as spatially separated multiple panels having a fixed positional relationship therebetween, for providing a first function to a user of the apparatus,
a body component formed as spatially separated multiple panels having a fixed positional relationship therebetween, for providing a second function to the user, where multiple panels of both of the cover and body components are each formed on a different spatial plane, and
a coupling structure for slidingly coupling together the spatially separated multiple panels of the cover and body components in an interleaved manner so that the spatially separated multiple panels of each of the cover and body components maintain their respective fixed positional relationship as the multiple panels of one of the cover and body components are simultaneously moveable as a group with respect to multiple panels of the other of the cover and body components between a first and a second position, wherein
in the first position multiple panels of the cover component at least partially cover multiple panels of the body component, and in the second position multiple panels of the cover component at least partially uncover multiple panels of the body component, and wherein
said at least partial covering and uncovering provides said first and said second functions, respectively, to the user.

2. The apparatus of claim 1, wherein in the first position, the first function presented to the user is one of either a first visual image, a storage compartment or a first electronic device.

3. The apparatus of claim 2, wherein in the second position, the second function presented to the user is one of either a second visual image, a storage compartment or a second electronic device.

4. The apparatus of claim 1, wherein in the first position, the first function presented to the user is a visual image, and in the second position, the second function presented to the user is an electronic device.

5. The apparatus of claim 1, wherein in the first position, the first function presented to the user is a first visual image, and in the second position, the second function presented to the user is a second visual image.

6. The apparatus of claim 1, wherein in the first position, the first function presented to the user is an electronic device, and in the second position, the second function presented to the user is a visual image.

7. The apparatus of claim 1, wherein in the first position, the first function presented to the user is a first electronic device, and in the second position, the second function presented to the user is a second electronic device.

8. The apparatus of claim 7, wherein the first and second electronic devices each comprise one or more of a cell phone, a personal audio player, a personal digital assistant (PDA), a computer, a calculator, an electronic game, a camera, and a global positioning system (GPS) receiver.

9. The apparatus of claim 1, wherein the multiple panels of both of the cover component and the body component are formed on different spatial planes.

10. A multi-state structure comprising:
a first portion having as a first state, a first function provided on a first set of multi-level sub-portions having a fixed positional relationship therebetween;
a second portion having as a second state, a second function provided on a second set of multi-level sub-portions having a fixed positional relationship therebetween;
said respective first and second sets of multi-level sub-portions each being arranged in differing spatial planes; and
a coupling structure for slidingly coupling together the sets of multi-level sub-portions of the first and second portions in an interleaved manner, so that sets of multi-level sub-portions of each of the respective first and second portions maintain their respective fixed positional relationship during sliding movement therebetween, said coupling structure enabling the first and second portions to be moveable from a first position to a second position, and when so moved, the multi-level sub-portions of each of said first and second sets of multi-level sub-portions maintain their respective fixed positional relationship so as to simultaneously pass each other in overlying relation as a group so that said structure exposes said first function in said first position and said second function in said second position, and thereby provides to a user of said structure either said first state or said second state, respectively.

11. The structure of claim 10, wherein in the first position, the first function presented to the user is a visual image, and in the second position, the second function presented to the user is an electronic device.

12. The structure of claim 10, wherein in the first position, the first function presented to the user is a first visual image, and in the second position, the second function presented to the user is a second visual image.

13. The structure of claim 10, wherein in the first position, the first function presented to the user is an electronic device, and in the second position, the second function presented to the user is a visual image.

14. The structure of claim 10, wherein in the first position, the first function presented to the user is a first electronic device, and in the second position, the second function presented to the user is a second electronic device.

15. A multi-state structure comprising:
a first portion having a first function and comprising a first plurality of sub-portions having a fixed positional relationship therebetween;
a second portion comprising a second plurality of sub-portions having a fixed positional relationship therebetween that collectively comprise an electronic device;
a coupling structure for slidingly coupling together the first and second plurality of sub-portions of the first and second portions in an interleaved manner, so that the first and second plurality of sub-portions of each of the respective first and second portions maintain their respective fixed positional relationship during sliding movement therebetween, said coupling structure enabling the first and second portions to be from a first position to a second position, and when so moved, said first and second pluralities of sub-portions maintain their respective fixed positional relationship so as to simultaneously pass each other in overlying relation as a group so that said structure exposes said first function in said first position and said electronic device in said second position.

16. The structure of claim 15, wherein the first function is a visual image.

17. The structure of claim 15, wherein the first function is also an electronic device.

18. The structure of claim 15, wherein the electronic device comprises one or more of a cell phone, a personal audio player, a personal digital assistant (PDA), a camera, a computer, a calculator, an electronic game, and a global positioning system (GPS) receiver.

19. The structure of claim 17, wherein the electronic devices comprise one or more of a cell phone, a personal medial player, a personal digital assistant (PDA), a camera, a computer, a calculator, an electronic game, and a global positioning system (GPS) receiver.

20. The structure of claim 15, wherein the plurality of sub-portions of at least one of the first and second portions are formed on a different spatial plane.

21. The structure of claim 15, wherein the plurality of sub-portions of both of the first and second portions are formed on a different spatial plane.

22. The structure of claim 21, wherein the first function is an electronic device.

23. The structure of claim 22, wherein the electronic devices of said first and second functions comprises one or more of a cell phone, an audio playing device, a personal digital assistant (PDA), a camera, a computer, a calculator, an electronic game, and a global positioning system (GPS) receiver.

24. The structure of claim 22, wherein the first function is cell phone and the second function is a media playing device.

25. The structure of claim 22, wherein the first function is cell phone and the second function is a calculator.

26. The structure of claim 22, wherein the first function is cell phone and the second function is a global positioning system (GPS) receiver.

27. The structure of claim 22, wherein the first function is a media playing device and the second function is a global positioning system (GPS) receiver.

28. The structure of claim 22, wherein the first function is a cell phone and the second function is a computing device.

29. The structure of claim 22, wherein the first function is cell phone and the second function is a video gaming device.

* * * * *